June 23, 1970     B. R. SHAH     3,517,337
MODULATION OF SCANNING BEAMS IN INJECTION LASERS
Filed Oct. 26, 1967

INVENTOR
BANKIM R. SHAH
BY *Howard H. Sweeney Jr.*
ATTORNEY

United States Patent Office 3,517,337
Patented June 23, 1970

3,517,337
MODULATION OF SCANNING BEAMS
IN INJECTION LASERS
Bankim R. Shah, Beacon, N.Y., assignor to International
Business Machines Corporation, Armonk, N.Y., a corporation of New York
Filed Oct. 26, 1967, Ser. No. 678,297
Int. Cl. H01s 3/10, 3/18
U.S. Cl. 332—7.51
5 Claims

ABSTRACT OF THE DISCLOSURE

A third electrical contact which consists of a separate diffused region having a constant length in the direction of lasing is provided in a semiconductor laser in addition to a first and second electrical contact which are diffused regions which vary in shape sinusoidally and cosinusoidally, respectively, in the direction of lasing. The first and second contacts have a sinusoidally varying and cosinusoidally varying current signal applied thereto, respectively. This energization in connection with the shapes of the first and second contacts along the direction of lasing provides a sweeping of the line of lasing along successive lines of a family of lines defined in the laser thereby providing scanning of any lasing beam. The third contact has applied thereto a modulated electric signal such that the threshold or degree of lasing is controlled, thus providing modulation of the continuously scanning beam.

---

This invention relates generally to electro-optical devices, and more particularly to modulation of a scanning beam in an injection semiconductor laser.

Although the semiconductor laser has become well known, it will be helpful to review the principles that particularly apply to this invention. When an electron goes from a high energy level to a low energy level, a photon is produced having a frequency that depends on the difference between the two levels. In some materials a high energy level electron is triggered to return to a low energy level state when it is hit by a photon of the frequency corresponding to the energy difference. When this occurs, two photons appear that are in phase (coherent).

A semiconductor laser is constructed so that there is a fairly high chance that a photon inside the material will strike another high energy electron and thereby produce further photons; from the opposite point of view the laser is constructed to reduce the chance that a photon will escape from the material without striking a high energy electron, or that the photon will only produce thermal energy within the laser material.

Some more detailed factors that establish whether lasing will occur will be summarized next. In the device of this invention these factors are controlled so that the line where lasing can occur is not only made to sweep, but is modulated to carry information.

The semiconductor body of the laser, which is called a cavity, has its end surfaces polished or silvered so that photons are reflected internally. This increases the photon travel within the cavity before it escapes and thereby increases the chances that the photon will collide with a high energy level electron. Sometimes other surfaces are roughened so that lasing cannot occur along some lines within the cavity. In the device of this invention this effect is used to establish a family of lines where lasing may occur, and an effect that will be explained later is controlled to establish the particular line or lines in the family of lines that lasing occurs on. In one specific embodiment the laser cavity has two flat parallel ends that are polished so that lasing may occur only on any line of a family of parallel lines perpendicular to the two surfaces. In another embodiment the laser cavity has cylindrical sides polished so that lasing can occur only on some radii of the cylinders.

As has already been mentioned, lasing occurs only when there are enough electrons in the high energy level that as many photons in the preferred direction are gained as are lost. In a semiconductor laser high energy level electrons are provided by current applied to the laser junction and the current can be modulated to establish or extinguish lasing. Considered in more detail, the effect of the current is to establish a region of high probability of producing additional photons. At a threshold current value more photons are produced than are lost and the light output increases abruptly. Where the contact does not extend along the full length of the cavity, lasing occurs when the photon gain in the region under the contact is high enough to make up for the losses within this region and also for the higher losses in the region outside the contact. In the device of this invention the effective length of the contact is made to vary with respect to time along the family of lines of possible lasing to make the beam sweep, while at the same time the beam is modulated so as to carry information. The term "contact" as used herein refers to a separate diffused region of semiconductor material which is electrically energized from an external source.

In applicant's earlier U.S. Pat. No. 3,402,366, a device is disclosed wherein the effective length of the contacts is controlled by forming two contacts spaced apart in the direction of lasing, so that currents of both contacts contribute to lasing. Each contact is shaped so that it presents a different length along each of the lines of possible lasing. The shapes of the two contacts are somewhat complementary so that where one provides only a short length in a direction of lasing, the other provides a longer length. Separate time varying current signals are applied to the two contacts, and these signals are shaped with respect to the contacts so that the lengths and current values are appropriate for lasing only along a unique line of the family of lines established by the reflecting surfaces. Various attempts were made to modulate the scanning beam of this prior art, however, it was found that any interference with the contact exitation signals upset the sweeping cycle. External means of modulating the sweeping beam were considered, all of which were found to be too complicated and cumbersome from an equipment point of view.

The above problems in the prior art have been solved in the instant invention by providing a further contact spaced apart from the two above mentioned contacts in the direction of lasing, and having a constant length in the direction of lasing, so that the current applied to this additional contact affects the lasing but does not interfere with the lasing line sweeping. A modulated current signal is applied to this contact which in conjunction with the amplitudes of the two contact current signals and lengths in the direction of lasing of the contacts provides corresponding modulation of the lasing beam as it sweeps.

It is the main object of the present invention to provide modulation of a lasing beam, while continuously sweeping.

It is another object of the present invention to provide a substantially on-off modulation of the continuously sweeping beam in accordance with a pulse code modulated input signal.

It is a further object of the present invention to provide intensity modulation of the continuously sweeping laser beam in correspondence to an amplitude modulated input signal.

The foregoing and other objects, features and advantages of the invention will be apparent from the following more particular description of two embodiments of the invention as illustrated in the accompanying drawings.

Figure 1:
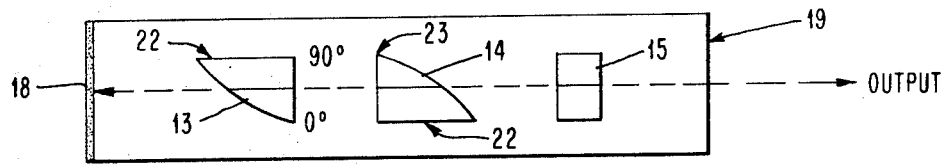
FIG. 1 is a plan view of the semiconductor laser of one embodiment of this invention with the plane of the junction parallel to the plane of the drawing.
Figure 2:
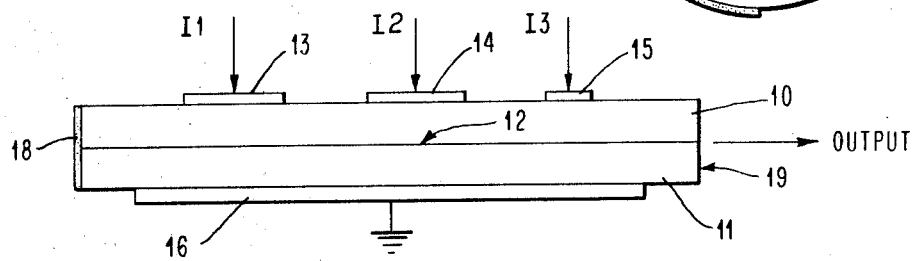
FIG. 2 is a front view of the semiconductor laser of FIG. 1 with the plane of the junction perpendicular to the drawing.

The semiconductor laser shown in FIGS. 1 and 2 comprises a body of semiconductor material having a P region 10 an N region 11 and a junction 12 along which lasing occurs. Three contacts 13, 14 and 15 are attached to one of the regions, arbitrarily P region 10, and suitable contact making means illustrated as a single contact 16 is attached to the other region. As arrowed lines in the drawing illustrate, terminals 13, 14 and 15 are suitably connected to means for supplying individual currents $I_1$, $I_2$ and $I_3$, respectively. When the currents $I_1$, $I_2$ and $I_3$ reach a threshold value as explained later, lasing occurs along a line parallel to the plane of the junction 12. The laser has its opposite ends 18 and 19 polished, so that a photon travelling representative line 20 in FIG. 1 or a parallel line is internally reflected and lasing can be established easily along the family of these lines. The light beam output occurs from end 19, and end 18 is preferably silvered as the speckled region in the drawing represents.

Figure 4:
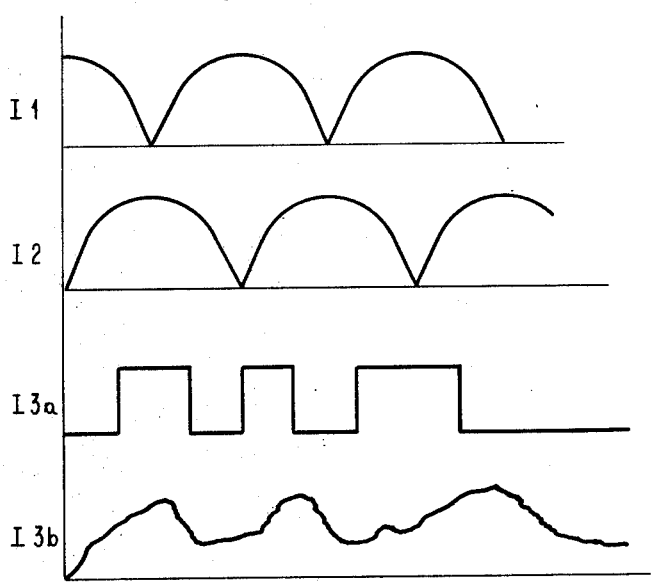
FIG. 4 shows current wave forms that are suitable for energizing the lasers of either embodiment of this invention.

In one application of the invention, the contact lengths 13, 14 are coordinated with the current signals $I_1$, $I_2$, so that scanning of the line along which lasing may take place occurs, but the condition of the laser is just below the threshold level. The length of contact 15 in the direction of lasing and its current signal $I_3$ are effective in controlling the threshold condition, and thus producing lasing along a particular line or lines during scanning. Referring to FIG. 4, two different modulated wave forms $I_3$ are shown, designated $I_{3a}$ and $I_{3b}$. $I_{3a}$ is a pulse code modulated input in which the amplitude of the pulses, in conjunction with the length of the contact 15 in the direction of lasing, is sufficient, in conjunction with the lengths of the contacts 13 and 14 and their respective currents $I_1$ and $I_2$ to exceed the threshold condition and thus cause lasing while simultaneously scanning. It will be appreciated, that in this application the lasing or light beam output from the laser will only be produced during the duration of the pulses of $I_{3a}$. Thus, a pulse code modulated input produces the same pulse code modulation of the output beam while it is continuously scanning. The modulation of contact 15 does not interfere with the scanning of the beam and thus the output beam exists for discrete times during the scanning cycle.

In a further application of the invention, the lengths of the contacts 13, 14 and 15 in the direction of lasing in conjunction with their respective input current signals $I_1$, $I_2$ and $I_3$ causes the laser device to exceed the lasing threshold. The lengths of contacts 13 and 14 in the direction of lasing and their currents are effective in causing scanning of the lasing beam while the length of contact 15 in the direction of lasing and its current $I_3$ is effective in controlling the intensity of the lasing beam. Thus, a modulated signal such as $I_{3b}$ applied to contact 15 will cause a corresponding change or modulation in the intensity of the lasing output beam while it continuously scans.

The exact shape of the various contacts can be best explained in terms of the operation of the laser. In FIG. 4, the wave forms of the two currents $I_1$ and $I_2$ are applied to contacts 13 and 14. The current wave form $I_1$ is a full wave rectified consinusoid and wave form $I_2$ is a full wave rectified sinusoid. These wave forms were chosen because they are simple to generate by means of well known circuits and because of the unique relationship of the contacts and the wave forms that will be described now. As has already been explained, the threshold for lasing is a function of the contact current and contact lengths in the direction of lasing. For a laser with multiple contacts the threshold for lasing is a function of the sum of the products of currents and lengths for each contact. Accordingly, the spaces between contacts 13, 14, 15 and the edges 18 and 19 of the device are functionally related to the total amount of current which must be applied to the device via contacts 13, 14 and 15. When FIG. 1 is viewed with the right-hand edge of the drawing uppermost contact 13 can be recognized as the first 90° of the sinusoid. The numbers zero and 90° are marked on FIG. 1, to indicate a time coordinate. Similarly from this viewpoint the length of contact 14 is a cosinusoidal function of the time axis in FIG. 1. The contact 15 has a fixed length in the direction of lasing. Thus, the product of current and length for contact 13 is $I_1L_0 \sin^2 wt$ and the product of current and length for contact 14 is a corresponding $\cos^2$ function of time. The product of current and length for contact 15 would be $I_3L_3$. It will be appreciated, that current $I_3$ is the controlling factor since length $L_3$ is a constant. Setting the above products of currents and lengths equal to a constant by utilizing the trigonometric identity $\sin^2 + \cos^2 = 1$ the sum of the current and length products for the contacts is a constant. Considering that the threshold relationship for a multicontact laser is $$\sum_{i=1}^{M}$$

$J_iL_i$=constant

Where: J=linear current density and L=length of "P" region. For the three contact case:

$$J_1 = J_0 \cos wt \quad L_1 = L_0 \cos \theta$$
$$J_2 = J_0 \sin wt \quad L_2 = L_0 \sin \theta$$
$$J_3 = I \text{ and } L_3 = L$$

The threshold condition, therefore, is $$J_1L_1 + J_2L_2 + J_3L_3 = K$$

This reduced to $J_0L_0 \cos(wt-0) + IL = K$. If we choose $J_0L_0 + IL = K$ as the condition for threshold, the condition is satisfied for $\cos(wt-0) = 1$; that is $wt = \theta$. Since the current I is pulse modulated, discrete scanning results. For example, the three discrete positions of the spots produced in the laser beam sweep depend strictly on the timing of the pulses shown in $I_{3a}$, FIG. 4. Likewise, the duration of the discrete spots in the sweep depend on the time of duration or length of the same pulses. The maximum length along edges 22 and maximum currents $I_1$ and $I_2$ are coordinated to make the threshold for lasing exist along a unique line that sweeps between edges 22 as a function of time. It will be appreciated, that the length in the direction of lasing of contact 15 and the current $I_3$ applied thereto are coordinated to control the threshold. That is, in the one case the length of contact 15 and its current $I_3$ are coordinated to cause the lasing threshold to be exceeded or not depending on the existence of a pulse at $I_3$. These pulses, shown on $I_{3a}$, produce pulse code modulation of the continuously sweeping beam. In another case, the product of the lengths of the contacts 13 and 14 and their respective currents are coordinated to exceed the lasing threshold along the particular line of a family of lines, while the product of the length of contact 15 and its current $I_3$ is varied by varying $I_3$ so that the degree or intensity of lasing is correspondingly varied. This provides corresponding amplitude modulation of the sweeping light beam in correspondence with the amplitude modulation of the current applied to contact 15. In the laser of FIG. 1 the maximum length along edge 22 is aligned with a point 23 of substantially zero length. Thus the maximum current values $I_1$, $I_2$, and $I_3$ are the appropriate value to produce lasing along an edge 22 when only one contact 13 or 14 and contact 15 is energized.

Figure 3:
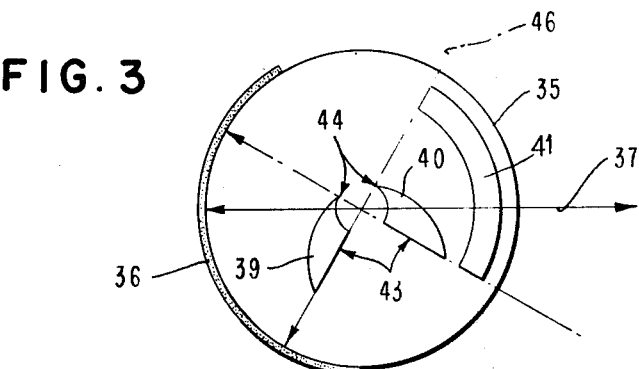
FIG. 3 is a plan view of the semiconductor laser of a second embodiment of this invention oriented similarly to FIG. 1.

A second embodiment of this invention shown in FIG. 3 includes a cylindrical body 35 of semiconductor material having P and N regions and a junction as described in connection with FIG. 2 for the laser of the first embodiment of the invention. A portion of the cylindrical surface 36 is silvered as the speckled area in the drawing represents so that internal reflections occur on radii of the cylinder and the light output appears on a family of radial lines to the right illustrated by line 37. The laser of FIG. 3 has three contacts 39, 40, and 41 on its uppermost surface. The contacts 39 and 40 are shaped to have sinusoidal and cosinusoidal lengths as a function of the angle, while contact 41 has a constant length as a function of the angle. The parallel between FIG. 3 and FIG. 1 can be seen by comparing the longest edges 43 of contacts 39, 40, with the corresponding edges 22 in FIG. 1 and by comparing the points 44 of substantially zero length in the direction of lasing with the corresponding points 23 in FIG. 1. There is a one to one equivalence of length of contacts 39, 40, 41 along radii to the lengths of contacts 13, 14, and 15 along horizontal lines in FIG. 1. When the wave forms of FIG. 4 are applied to contacts 39, 40, and 41, a light beam is produced which is modulated in accordance with input signals $I_{3a}$ or $I_{3b}$ and which simultaneously sweeps radially between the radius of edge 43 of contact 40 and a radius 46 opposite to edge 43 of contact 39.

In summary, the requirements for producing modulation of a continuously sweeping laser beam requires a fixed length contact in the direction of lasing, which can have a modulated current signal applied thereto to modulate the lasing by controlling the lasing threshold level or intensity while the sums of the product of current and contact length of the other contacts in the direction of lasing provide a unique line of a family of permissible lines along which lasing may take place. The constant length in the direction of lasing and the current signal applied to contact 15 have been selected to provide control of the threshold of lasing in the device, while the contact shapes and current signals of contacts 13 and 14 have been selected to produce a sweeping action in which either the position or the angle of the beam is a linear function of time. The signals of the waveforms of FIG. 4 or the contacts can be stretched (so long as the current amplitudes are properly related) or the currents can be made discontinuous to provide differing sweep configurations.

While the invention has been particularly shown and described with reference to two embodiments thereof, it will be understood by those skilled in the art that the foregoing and other changes in form and detail may be made therein without departing from the spirit and the scope of the invention.

I claim:

1. In a laser device capable of beam scanning by applying differing current waveforms to the device via two contact means which are spaced apart in the direction of lasing and are shaped to have a differing length along each line of lasing, the lengths of said two contact means along a common line being related so that lasing may occur along a selected one of said lines in response to a unique pair of current values applied to said first and second contact means;

a third contact means having a constant length along each of said lines of possible lasing for applying a modulated current to said device;

the length of said third contact means and the modulated current applied thereto in conjunction with the lengths of said first and second contact means and the currents applied thereto providing a modulation of the lasing of the scanning beam.

2. In a laser device according to claim 1, wherein the input current to said third contact means is pulse code modulated and the currents in combination with the lengths of the first and second contacts in the direction of the lines of lasing are insufficient to cause the device to exceed the lasing threshold level, the current pulses of the pulse code modulated current being of sufficient amplitude in conjunction with the currents and lengths of said first and second contacts to cause the device to exceed the threshold level of lasing thereby providing a substantially on-off modulation of the continuously sweeping beam.

3. In a laser device according to claim 1, wherein the input current to said third contact means is amplitude modulated and the currents applied to the first and second contacts in combination with their respective lengths in the direction of the lines of lasing are sufficient to cause the device to exceed the lasing threshold level thereby providing intensity modulation of the continuously sweeping laser beam in accordance with the current variations of the amplitude modulated current.

4. In a laser device according to claim 1, wherein said lasing device is rectangular and said lines of lasing are parallel, said third contact means is rectangular and of sufficient length to intercept each of said lines of lasing.

5. In a laser device according to claim 1, wherein said lasing device is cylindrical and said lines of lasing are along radii of said cylinder, said third contact is a section of said cylinder having the same curvature as said cylinder and subtends a sufficient angle at the center of said cylinder so as to intercept all of said lines of lasing.

References Cited

UNITED STATES PATENTS

| 3,344,365 | 9/1967 | Lewis | 331—94.5 |
| 3,402,366 | 9/1968 | Williams et al. | 331—94.5 |
| 3,436,679 | 4/1969 | Fenner | 331—94.5 |

OTHER REFERENCES

Williams et al., "IBM Technical Disclosure Bulletin," February 1965, p. 802.

ROY LAKE, Primary Examiner

D. R. HOSTETTER, Assistant Examiner

U.S. Cl. X.R.
331—94.5; 350—160; 332—9, 52